US011465942B2

(12) United States Patent
Desiles et al.

(10) Patent No.: US 11,465,942 B2
(45) Date of Patent: Oct. 11, 2022

(54) CERAMIC GRAINS AND METHOD FOR THEIR PRODUCTION

(71) Applicant: Magotteaux International S.A., Vaux-sous-Chèvremont (BE)

(72) Inventors: Stephane Desiles, Villers-le-Temple (BE); Hubert François, Ans (BE)

(73) Assignee: Magotteaux International S.A., Vaux-sous-Chèvremont (BE)

( * ) Notice: Subject to any disclaimer, the term of this patent is extended or adjusted under 35 U.S.C. 154(b) by 932 days.

(21) Appl. No.: 15/325,888

(22) PCT Filed: Jul. 16, 2015

(86) PCT No.: PCT/EP2015/066244
§ 371 (c)(1),
(2) Date: Jan. 12, 2017

(87) PCT Pub. No.: WO2016/008967
PCT Pub. Date: Jan. 21, 2016

(65) Prior Publication Data
US 2017/0152193 A1 Jun. 1, 2017

(30) Foreign Application Priority Data

Jul. 16, 2014 (BE) .................................. 2014/0559

(51) Int. Cl.
*C04B 41/00* (2006.01)
*C04B 35/624* (2006.01)
(Continued)

(52) U.S. Cl.
CPC ............ *C04B 41/009* (2013.01); *B02C 23/00* (2013.01); *C04B 35/119* (2013.01);
(Continued)

(58) Field of Classification Search
None
See application file for complete search history.

(56) References Cited

U.S. PATENT DOCUMENTS 3,181,939 A 5/1965 Marshall
3,454,385 A 7/1969 Amero
(Continued)

FOREIGN PATENT DOCUMENTS

EP 152768 A2 8/1985
EP 0575685 A1 12/1993
(Continued)

OTHER PUBLICATIONS

International Search Report and Written Opinion dated Sep. 24, 2015 for application PCT/EP2015/066244, filed on Jul. 16, 2015 and published as WO/2016/008967 on Jan. 21, 2016 (Applicant—Magotteaux Int'l, S.A. // Inventor—Desiles, et al.) (9 pages).

*Primary Examiner* — Ronak C Patel
(74) *Attorney, Agent, or Firm* — Kolitch Romano LLP

(57) ABSTRACT

The disclosure relates to sintered ceramic grains comprising 3-55 wt. % alumina, 40-95 wt. % zirconia and 1-30 wt. % of one or more other inorganic components.
The invention further relates to a method for preparing ceramic grains according to the invention, comprising:
  making a slurry comprising alumina, zirconia;
  making droplets of the slurry;
  introducing the droplets in a liquid gelling-reaction medium wherein the droplets are gellified;
  drying the gellified deformed droplets.

16 Claims, 4 Drawing Sheets

(51) Int. Cl.
  *C04B 35/64* (2006.01)
  *C04B 35/626* (2006.01)
  *B02C 23/00* (2006.01)
  *C04B 41/51* (2006.01)
  *C04B 41/88* (2006.01)
  *C09K 3/14* (2006.01)
  *C22C 1/10* (2006.01)
  *F41H 5/04* (2006.01)
  *C04B 35/484* (2006.01)
  *C04B 35/63* (2006.01)
  *C04B 35/653* (2006.01)
  *C04B 35/119* (2006.01)
  *C04B 35/636* (2006.01)
  *C04B 35/488* (2006.01)

(52) U.S. Cl.
  CPC ........ *C04B 35/484* (2013.01); *C04B 35/4885* (2013.01); *C04B 35/624* (2013.01); *C04B 35/62605* (2013.01); *C04B 35/636* (2013.01); *C04B 35/6316* (2013.01); *C04B 35/64* (2013.01); *C04B 35/653* (2013.01); *C04B 41/5144* (2013.01); *C04B 41/5155* (2013.01); *C04B 41/88* (2013.01); *C09K 3/1409* (2013.01); *C09K 3/1436* (2013.01); *C22C 1/1036* (2013.01); *F41H 5/0414* (2013.01); *B02C 2210/02* (2013.01); *C04B 2235/3205* (2013.01); *C04B 2235/3208* (2013.01); *C04B 2235/3217* (2013.01); *C04B 2235/3224* (2013.01); *C04B 2235/3225* (2013.01); *C04B 2235/3244* (2013.01); *C04B 2235/3248* (2013.01); *C04B 2235/349* (2013.01); *C04B 2235/3418* (2013.01); *C04B 2235/3427* (2013.01); *C04B 2235/3804* (2013.01); *C04B 2235/3817* (2013.01); *C04B 2235/3852* (2013.01); *C04B 2235/40* (2013.01); *C04B 2235/442* (2013.01); *C04B 2235/602* (2013.01); *C04B 2235/6021* (2013.01); *C04B 2235/6023* (2013.01); *C04B 2235/612* (2013.01); *C04B 2235/616* (2013.01); *C04B 2235/765* (2013.01); *C04B 2235/77* (2013.01); *C04B 2235/784* (2013.01); *C04B 2235/786* (2013.01); *C04B 2235/788* (2013.01); *C04B 2235/80* (2013.01); *C04B 2235/96* (2013.01); *C22C 2001/1021* (2013.01)

(56) References Cited

U.S. PATENT DOCUMENTS

| | | | | |
|---|---|---|---|---|
| 5,151,201 | A | * | 9/1992 | Fishler .................. B22D 41/54 222/600 |
| 5,667,742 | A | * | 9/1997 | Dwivedi ............... B22F 1/0059 264/658 |
| 6,258,440 | B1 | * | 7/2001 | Aihara .................. C04B 41/009 428/141 |
| 2002/0136857 | A1 | * | 9/2002 | Francois ................ B02C 13/28 428/67 |
| 2003/0038129 | A1 | * | 2/2003 | Hiramatsu ............. H05B 3/143 219/444.1 |
| 2006/0057356 | A1 | * | 3/2006 | Yamamura .......... C04B 38/0058 428/312.2 |
| 2012/0082849 | A1 | * | 4/2012 | Nonnet ................. C04B 35/119 428/402 |

FOREIGN PATENT DOCUMENTS

| | | |
|---|---|---|
| EP | 0930948 A1 | 7/1999 |
| WO | WO-2009/018024 A1 | 2/2009 |
| WO | WO-2010/140121 A1 | 12/2010 |
| WO | WO-2013/011436 A1 | 1/2013 |
| WO | WO-2014/020522 A1 | 2/2014 |

* cited by examiner

Fig. 1.4
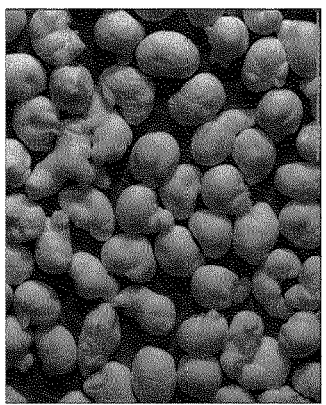
Fig. 1.3
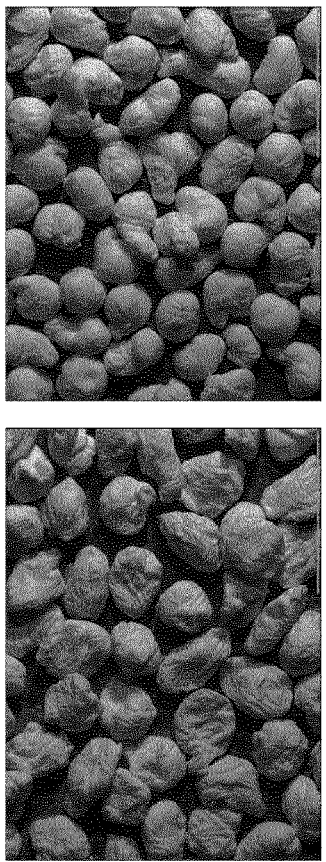
Fig. 1.2
Fig. 1.1
Fig 2.4
Fig. 2.3
Fig. 2.2
Fig. 2.1

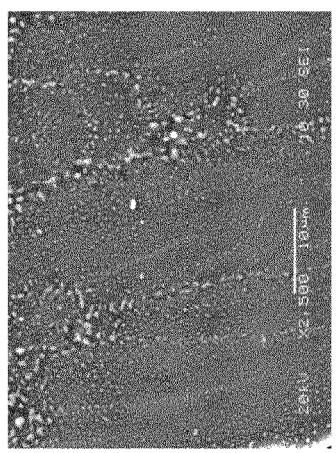
Fig. 3.4
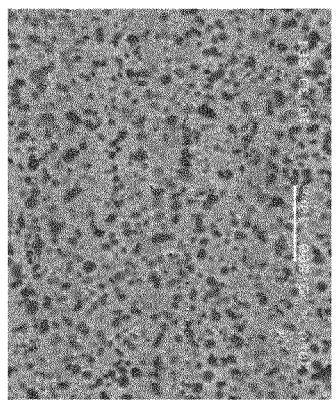
Fig 3.3
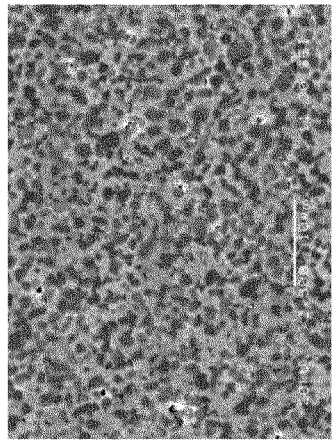
Fig. 3.2
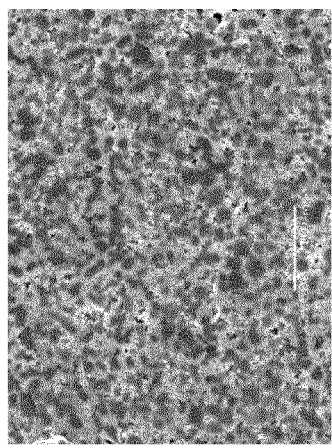
Fig. 3.1
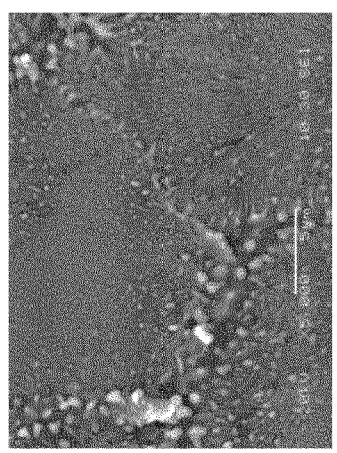
Fig 4.4
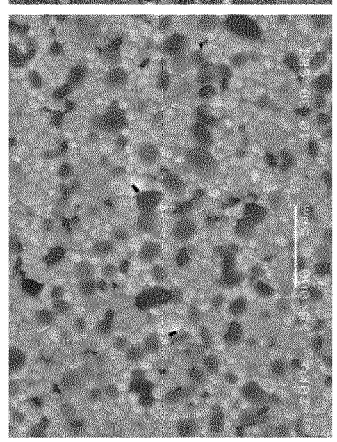
Fig. 4.3
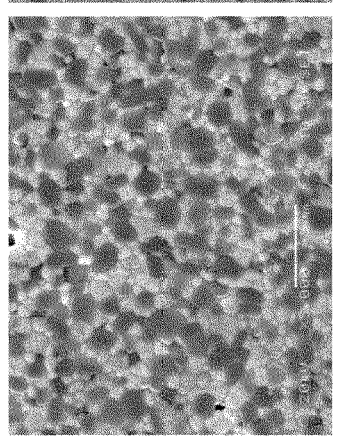
Fig. 4.2
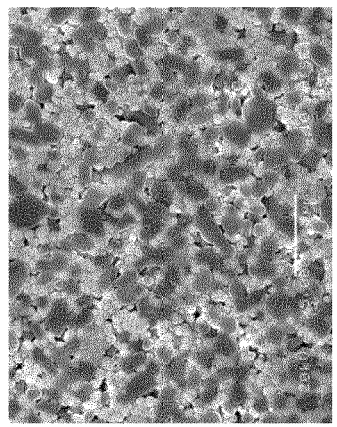
Fig. 4.1

CERAMIC GRAINS AND METHOD FOR THEIR PRODUCTION

The invention relates to a method for preparing sintered ceramic grains, for use as ceramic grains, as open-porous ceramic structure formed of a three-dimensionally interconnected network of ceramic wear component, and as a comminution (reduction) device and the use of a comminution device.

The invention relates to ceramic grains notably, but not exclusively, used in wear components, containing ceramic grains, in particular wear components used in plants for grinding, crushing and conveying various abrasive materials which are encountered in industrial uses, in particular in cement factories; mines; metal industries, such as for instance steel-making industries; in foundries; power stations; recycling activities; quarries; dredging; ground engaging; oil-sands recovery.

The following is a Brief Description of the Drawings:

FIG. 1.1 is a binocular view photograph of whole grains in accordance with aspects of the present teachings.

FIG. 1.2 is a binocular view photograph of whole grains in accordance with aspects of the present teachings.

FIG. 1.3 is a binocular view photograph of whole grains in accordance with aspects of the present teachings.

FIG. 1.4 is a comparative image of grains of Comparative Example 1. FIG. 2.1 is a microscope view of a polished cross-section in accordance with aspects of the present teachings.

FIG. 2.2 is a microscope view of a polished cross-section in accordance with aspects of the present teachings.

FIG. 2.3 is a microscope view of a polished cross-section in accordance with aspects of the present teachings.

FIG. 2.4 is a comparative image of grains of Comparative Example 1. FIG. 3.1 is an electronic microscope view made after etching grains in accordance with aspects of the present teachings.

FIG. 3.2 is an electronic microscope view made after etching grains in accordance with aspects of the present teachings.

FIG. 3.3 is an electronic microscope view made after etching grains in accordance with aspects of the present teachings.

FIG. 3.4 is a comparative image of grains of Comparative Example 1.

FIG. 4.1 is an electronic microscope view.

FIG. 4.2 is an electronic microscope view.

FIG. 4.3 is an electronic microscope view.

FIG. 4.4 is a comparative image of grains of Comparative Example 1.

Figure 5:
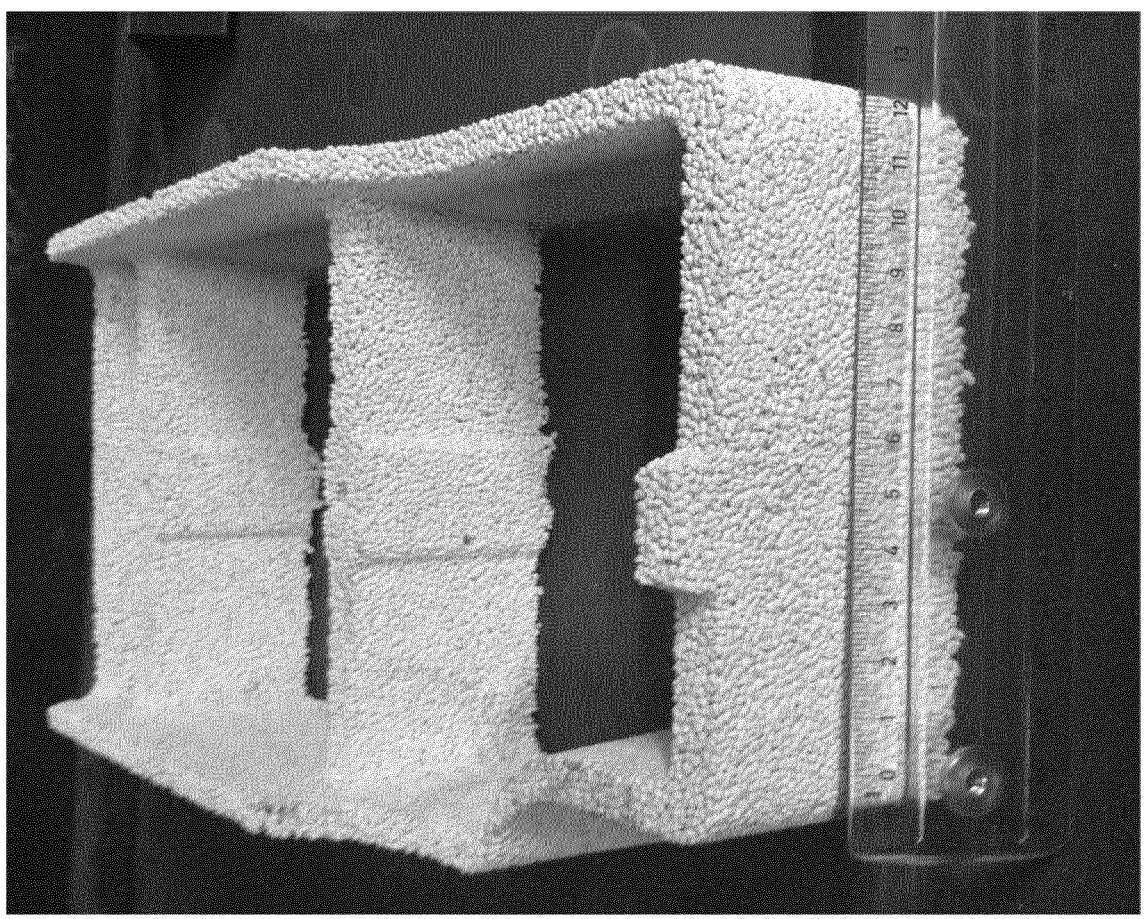
FIG. 5 is a photograph of an illustrative ceramic structure in accordance with aspects of the present teachings.

U.S. Pat. No. 3,454,385 relates to an abrasive composition suitable for heavy duty snagging includes 30 to 70% alumina, 15 to 60% zirconia, and 5 to 15% of one or more oxides of iron, titanium, manganese, and silicon. The material is preformed in the final desired shape before firing, fired to size and employed in the uncrushed state as tumbling media or as an abrasive grain for use in organic bonded grinding wheels.

EP 152 768 (A) relates to a ceramic body for use in abrasive applications. The body contains alpha alumina submicron crystallites and has been made by sintering at a temperature below 1400° C. A manufacturing method is described wherein alumina is gelled under acidic conditions. The gel is dried and then roll crushed, after which it is screened before firing to yield the desired final grit sizes.

Other methods exist for making ceramic grains such as fluidized bed, optimized compaction-granulation, etc.

In particular, wear components and abrasive cut-of tools are often subjected to high mechanical stress in the bulk and to a high wear at the working face. It is therefore desirable that these components present a high wear resistance and some ductility, to be able to withstand the mechanical stresses such as impact, abrasion, friction, erosion and/or corrosion.

Given that these two properties are difficult to reconcile with one another in the same material, composite components have already been proposed which have a core made of an alloy in which isolated ceramic inserts having a good wear resistance are embedded. Typically, the alloy is more ductile than the ceramic inserts.

EP 0575 685 (A) relates to a composite wear component of ceramic inserts in a metal matrix. The method of manufacturing described in this document has various limitations, in particular with respect to the dimensions of wear components that are manufactured.

EP 0930 948 (A) relates to a wear component consisting of a metal matrix whose wear surface comprises inserts which have good abrasion resistance properties, these inserts being made of a ceramic material, itself composite, consisting of a solid solution or homogeneous phase of 20 to 80% of $Al_2O_3$ and 80 to 20% of $ZrO_2$, the percentages being expressed by weight of constituents. Preferably, the $Al_2O_3$ content of the inserts is at least 55 wt. %. The examples show ceramic pads (inserts) made from electrofused grains with a $ZrO_2$ content of 25 wt. % and 40 wt. % respectively.

Although a wear component made from such a ceramic pad is satisfactory for use in various grinding applications, the present inventors concluded that there is a need for an alternative, in particular an improved wear component that may offer an advantage in specific applications, or a wear component that offers a further improvement in the wear component itself. In particular, the present inventors noticed that the electrofused grains may still suffer from pre-existing cracks formed due to the process used to obtain the grains, which is amongst others detrimental to the operational lifetime of the wear component, or which may result in a higher product-rejection rate or disruption of the grains during storage.

Also there is a desire for improving the methodology of making the ceramic-metal wear component or a part thereof, such as the ceramic material. In particular, it would be desirable to provide a methodology which is improved in that it is less energy-consuming, less time-consuming, less material-consuming or having a reduced rejection-rate (fraction of a product that does not meet the desired specifications).

It is an object of the present invention to provide a novel ceramic material for use in a ceramic-metal wear composite component for use in the comminution of a material with satisfactory toughness and hardness that offers an alternative for known ceramic materials, respectively known wear components, in particular to offer a ceramic material in that is less susceptible to crack forming in the ceramic material or the metal phase of the wear component.

It is a further object of the invention to provide a method for the preparation of ceramic grains, in particular a method that fulfils one or more of the above mentioned desires.

It is a further object of the invention to provide a novel ceramic material for use in abrasion applications such as, notably but not exclusively, grinding wheel and sand paper.

One or more other objects that are addressed will be apparent from the description herein below.

The inventors now found that a specific ceramic composition, respectively a specific technology for preparing ceramic grains is suitable to address one or more objects underlying the invention.

Accordingly the invention relates to sintered ceramic grains comprising 3-55 wt. % alumina, 40-95 wt. % zirconia and 1-30 wt. % of other inorganic component(s), said other components comprising at least one component selected from the group of rare earth metal oxides and alkaline earth metal oxides.

Further the invention relates to a method for preparing ceramic grains according to the invention, comprising
- making a slurry comprising alumina, zirconia, optionally one or more other inorganic components and a gelling agent;
- making droplets of the slurry;
- introducing the droplets in a liquid gelling-reaction medium wherein the droplets are gellified;
- deforming the droplets before, during or after gellification;
- drying the gellified deformed droplets, thereby obtaining dried grains and sintering the dried grains, thereby obtaining the ceramic grains.

Further, the invention relates to an open-porous ceramic structure formed of a three-dimensionally interconnected network of ceramic grains according to the invention, joined to each with a binding agent, wherein a packing of the grains provides for open pores between the grains, which pores are fillable by a liquid metal.

Further, the invention relates to a metal-ceramic composite wear component made of an open porous ceramic structure according to the invention and a metal matrix surrounding at least a part of the ceramic structure.

Further, the invention relates to a method of preparing a wear component according to the invention, comprising:
- providing a ceramic structure according to the invention;
- filling the open pores of the ceramic structure with liquid metal; and
- allowing the liquid metal to solidify, thereby forming the wear component.

Further, the invention relates to a comminution device, in particular an apparatus selected from the group of grinding devices and crushing devices, comprising a wear component according to the invention.

Further, the method relates to a method of treating a material, comprising introducing the material in a device according to the invention and subjecting the material to a comminution step wherein the wear component is contacted with the material, in particular a comminution step selected from the group of grinding and crushing.

Further, the invention relates to an abrasive cut-off tool, made from ceramic grains according to the invention or from an open-porous ceramic structure according to the invention.

Further, the invention relates to a composite armour, made from ceramic grains according to the invention or from an open-porous ceramic structure according to the invention.

Further, the invention relates to a dredging pump comprising a wear component according to the invention.

Further, the invention relates to a flexible coated abrasive product, such as sand paper, having an abrasive surface provided with ceramic grains according to the invention.

The invention allows the preparation of ceramic grains with satisfactory properties notably for use as a ceramic component in a ceramic-metal wear component of a comminution device, such as in a comminution device selected from the group of mills, in particular horizontal tube mills and vertical grinding mill; crushing devices, in particular horizontal shaft crushers; and impactor devices, in particular vertical shaft impactors.

The wear components may in particular be provided in a comminution device for use in a plant for grinding, crushing or conveying various abrasive materials which are encountered in industries such as cement factories, mines, metallurgy, power stations, recycling activities, quarries, dredging, oil-sand recovery.

In a further embodiment, the grains are provided in abrasive cut-off tools, such as abrasive cut-off wheels, sand-paper or in composite armour.

The invention offers a number of process-related advantages. For instance, it allows the manufacture of grains without needing crushing operations. Also, a plurality of grains are typically provided with a high homogeneity in size, without needing to subject the plurality of grains to a size based separation step, such as screening. Further, a method according to the invention can be operated with satisfactory energy-efficiency, which, at least compared to some known technologies is improved.

It is in particular an advantage that the invention allows the manufacture of grains with a low occurrence of weak spots, in particular cracks, or that are essentially free of weak spots, in particular cracks, compared to ceramic grains having the same composition produced, for instance, in a process wherein grains are made by first melting the ingredients, then quenching the melt to form a fused ceramic and breaking the fused ceramic to obtain the grains. This is illustrated in the FIG. 2.1 showing a polished cross-section of grains according to the invention having a grain size of about 1.6 mm. In these grains according to the invention no significant cracks are present. FIG. 2.4 shows a comparable granular product prepared following teachings of U.S. Pat. No. 3,181,939, produced by melting (electrofusion), quenching and crushing. One can observe that cracks (the dark lines) are visible along a significant part of the width of the grain.

The invention is further advantageous in that it allows the provision of grains with a satisfactory wear resistance, thereby offering a satisfactory lifetime expectancy of wear components made from the grains, which is similar or improved compared to wear components made from comparable granular products produced by, for instance, electrofusion.

The invention is further advantageous in that it allows the provision of grains with a low pulverization tendency, which reduces fall-out percentage of the product (before further use) but is also advantageous for the lifetime of the wear component.

It is further an advantage of the method of the invention that the grains preparation process is well-controllable, allows the production of (a plurality of) grains with a relatively high homogeneity in form, mechanical properties and/or size and in sizable volume. Without being bound by theory, it is believed that the relatively large homogeneity of the grains in particular with respect to material properties, such as toughness and hardness, and the low abundance of weak spots contributes to good lifetime expectancy, also if the content of ceramic ingredients that are conventionally used to improve wear resistance is low.

The inventors thus concluded that it is possible to provide ceramic grains with a relatively high hardness or toughness, taking into account other product properties, such as the material composition, the packing density (volume ratio of the ceramic material to the total volume of a large quantity of grains) or ceramic material density of the grains. In particular, the inventors found that in accordance with the invention it is possible to provide grains with a relatively low material density, a satisfactory hardness and a satisfactory toughness for use in a wear component of a grinding, crushing or other comminution device. The use of a material with relatively low density is for instance useful in order to save on usage of materials.

In particular grains obtainable in accordance with the invention are characterisable by having a rounded appearance with a striated surface. At the surface ripples are present, see e.g. FIGS. 1.1-1.3, as opposed to grains formed by crushing blocks of electrofused raw material, which results in grains that are sharp and have edges (FIG. 1.4). Further, the particles of the invention may have a more spheroidal appearance, whereas grains formed by crushing have a more polygonal cross-section. Furthermore, the form of the grains according to the invention tends to be smoother as compared to conventional crushed grains.

It should be noted that—in the art—a smooth form is generally considered disadvantageous in a ceramic-metal composite, unless chemical bonds are provided between the ceramic and the metal, because it is generally thought that the ceramic may fall out relatively easily. Nonetheless, a wear component according to the invention has satisfactory properties in this respect. It is apparent that irregularities and grooves at the surface, being roughness, provide for sufficient hold of the grain in the ceramic-metal composite to give the composite sufficient wearing characteristics.

The inventors contemplate that grains of the invention have a shape that is favourable with respect to its packing behaviour. The grains have a higher packing behaviour than the regular crushed grains, whereby it allows putting a higher volume percentage of wear resistant material (the ceramic material) in the ceramic-metal composite.

The term "or" as used herein means "and/or" unless specified otherwise.

The term "a" or "an" as used herein means "at least one" unless specified otherwise.

The term "substantial(ly)" or "essential(ly)" is generally used herein to indicate that it has the general character or function of that which is specified. When referring to a quantifiable feature, these terms are in particular used to indicate that it is for at least 75%, more in particular at least 90%, even more in particular at least 95% of the maximum that feature.

When referring to a "noun" (e.g. a compound, an additive etc.) in singular, the plural is meant to be included, unless specified otherwise.

When referring to a percentage, this is usually the weight percentage (wt. %) based on total weight of a composition, unless indicated otherwise.

For the purpose of clarity and a concise description features are described herein as part of the same or separate embodiments, however, it will be appreciated that the scope of the invention may include embodiments having combinations of all or some of the features described.

When referring to a concentration or amount, the concentration/amount based on the total weight of the material or product (e.g. ceramic, grain) to which is referred is meant, unless otherwise specified.

The chemical composition of the ceramic can be determined using X-ray fluorescence (XRF).

The crystalline composition and amorphous phase amount of the ceramic can be determined using X-ray diffraction.

In an advantageous embodiment, the grains according to the invention are made by a method of the invention. In a method of the invention, a slurry is made of inorganic non-metallic particles and a gelling agent. The particles are typically particles that are suitable as a starting material for the ceramic grains. Generally, the inorganic non-metallic particles provide alumina, zirconia and optionally one or more other components. Such components are usually selected from the group of other inorganic oxides, silicates, carbonates, carbides, borides and nitrides. The alumina and zirconia may be provided as particles of single inorganic oxide or as a mixed inorganic oxide. Preferred inorganic oxide particles next to alumina particles and zirconia particles are rare earth metal particles. Further, one or more inorganic oxides may in particular be selected from the group of titanium oxide and iron oxide. Calcium carbonate is a preferred carbonate. Preferred silicate particles include zirconium silicate, clays, talc.

The inorganic components for the ceramic grains, typically provided in a microparticulate form, and the gelling agent are usually dispersed in an aqueous liquid, i.e. a liquid at least substantially consisting of water. Preferably, a dispersant is used in addition to the gelling agent. The dispersant facilitates the dispersion of the inorganic components in the liquid and avoids flocculation of inorganic components. Suitable dispersants, and effective concentrations, for providing slurries of inorganic oxide microparticles, are generally known in the art and include anionic surfactants, for instance carboxylic acid surfactants, e.g. Dolapix CE64™. An anionic polyelectrolyte dispersant may be used, such as a poly(meth)acrylic acid. A commercially available polymethacrylic acid is Darvan C™.

The inorganic components from which the grains are made are typically microparticles, in particular microparticles having a largest diameter, as determinable by sedimentation (Sedigraph®) of 100 µm or less, preferably of 0.1 to 30 µm. The $d_{50}$ of the microparticles preferably is less than 2 µm. The microparticles are preferably obtained by grinding. In an advantageous embodiment the raw material for the inorganic oxide particles (typically particulate matter having a larger size than the microparticles used for the preparation of the grains) are mixed with water and ground to obtain microparticles with a desired size.

The individual microparticles may consist of a single phase or of a plurality of phases.

A slurry may be made of microparticles each formed of the same material, e.g. the same inorganic oxide or particles of different materials, e.g. different inorganic oxides, may be slurried.

In particular, good results have been achieved with a slurry that comprises alpha-alumina particles and zirconia particles. The alumina in particular contributes to a good hardness. The zirconia in particular contributes to a good toughness. Zirconia is a crystalline oxide, having zirconium as the major metal element. Several crystalline phases of zirconia are known, such as monoclinic zirconia, cubic zirconia and tetragonal zirconia. Unless specified otherwise, when referred herein to zirconia this means zirconia in any crystalline form.

The zirconia particles usually contain hafnium oxide ($HfO_2$), which is naturally present in most zirconia minerals in trace amounts, usually forming up to 5 wt. % of the mineral, in particular 1 to 2 wt. %. The zirconia in the grains may further comprise one or more other metal elements in its crystalline structure, such as one or more rare earth metals oxides, or oxides selected from the group of calcium oxide, magnesium oxide, tantalum oxide and niobium oxide. These may be present in the raw zirconia used for preparation of the grains, or be incorporated into the zirconia crystal structure during the preparation process of the invention.

Further, particles of a rare earth oxide or calcium oxide, magnesium oxide, tantalum oxide, niobium oxide may be used, in particular in combination with zirconia particles. The presence of rare earth or calcium oxide, magnesium oxide, tantalum oxide, niobium oxide is in particular advantageous for stabilising zirconia and for reducing the amount of monoclinic phase.

Preferred silicate particles are zirconium silicate particles. Depending on the temperature and the constituents, the zirconium silicate may form zirconia or mullite or amorphous phase or other phases containing silica depending on the other elements present in the composition. Anorthite or spinel may also be formed during sintering, if calcium respectively magnesium are present.

The amounts of the different types of particles can be varied as desired, dependent on the composition of the ceramic grains that is intended to be formed.

In a specific embodiment, an amount of hard phase like carbides, borides, nitrides is added; if used, the amount thereof, typically is up to 45 wt. % based on total inorganics, in particular 0.5-25 wt %. The carbide may in particular be used for increasing hardness. Examples of suitable hard phases are titanium carbide, silicon carbide, tungsten carbide, vanadium carbide, niobium carbide, tantalum carbide, zirconium carbide, hafnium carbide, silicon nitride, titanium boride and titanium nitride.

The total concentration of inorganic particles in the slurry usually is 40-80 wt. %, in particular 50-75 wt. %, more in particular 55-70 wt. %, based on the weight of the slurry.

The gelling agent can be slurried with the other ingredients or added to a pre-formed slurry of inorganic particles. Preferably, the gelling agent is added after the grinding of the inorganic raw materials. The gelling agent usually is a polymeric gelling agent comprising functional groups that can be cross-linked chemically, photonically or thermally. Preferably, the gelling agent is an anionic polymer. Anionic polymeric gelling agent are in particular preferred because they can be gellified by interaction with a multivalent cation, such as a divalent metal cation or a trivalent cation, whereby (electrovalent) crosslinks are formed between two anionic groups of the polymer. It has been found that multivalent cations can be used without adversely affecting the grain properties to an unacceptable extent. At least in some embodiments, the multivalent cation contributes in a favourable manner to the product quality. Suitable multivalent metal ions for crosslinking an anionic gelling agent include multivalent transition metal ions—in particular ions of zinc, iron, chromium, nickel, copper or a rare earth element such as yttrium, and alkaline earth metal ions, such as barium or calcium. Examples of anionic groups of the polymeric gelling agent that can form a crosslink together with a multivalent metal ion are carboxylates, alkoxylates, phosphonates, and sulphonates.

Preferably, an anionic polysaccharide is used as a gelling agent, in particular a polysaccharide comprising carboxyl groups. In particular good results have been achieved with an alginate. The gelling agent is present in the slurry in a concentration that is effective to cause gellification in the gelling-reaction medium, yet at which concentration the slurry remains fluid (and thus not-gellified) and that droplets can be formed from it. As a rule of thumb, the viscosity of the slurry when making the droplets is below 20,000 mPa·s, in particular in the range of 50-10,000 mPa·s, more in particular in the range of 1,000-7,000 as determined at a shear rate of $1.25\ s^{-1}$. As a rule of thumb, the concentration of gelling agent usually is in the range of 0.2-5 wt. % of the total weight of the inorganic oxide particles, preferably in the range of 0.3-3 wt. % of the total weight of the inorganic oxide particles.

Then droplets are made of the slurry. This can be done in manner known per se, using nozzles. Droplet size can be varied by changing the nozzle size, which is usually in the range 0.01 to 10 mm.

In principle it is possible to deform the droplets during or after gellification, i.e. when the droplets are dimension stable in the absence of applied external force but can still be deformed without destruction of the droplet, e.g. by moulding or pressing with a stamp or the like. Preferably, deformation takes place during the gellification. In particular, good results have been achieved with a method wherein deformation takes place while the droplets are still substantially fluid. More in particular, good results have been achieved with a method wherein the surface of the droplets is gellified and the core of the droplets is fluid.

The droplets are introduced in the gelling-reaction medium. One option is to inject the droplets in the gelling-reaction medium. In particular, good results have been achieved with a method wherein the droplets are formed remote from the gelling-reaction medium and are allowed to fall, preferably in a free-fall, through air or another gas phase before they enter the gelling-reaction medium.

The droplets are preferably deformed as they enter the gelling-reaction medium or in the gelling-reaction medium at or near the surface of the gelling-reaction medium (generally within 1 cm of the surface). The deformation preferably takes place before substantial gellification has occurred (i.e. whilst at least the core of the droplet is still essentially fluid). This is in particular considered advantageous in order to obtain grains with a striated surface, such as illustrated by FIG. 1.1.

The deformation may be accomplished in any way. The deformation may comprise a shock treatment or mechanical deformation, e.g. deformation may be accomplished by impacting the droplets on an obstacle or forcing them to go through a deforming device, like an extruder.

Figure 6B:
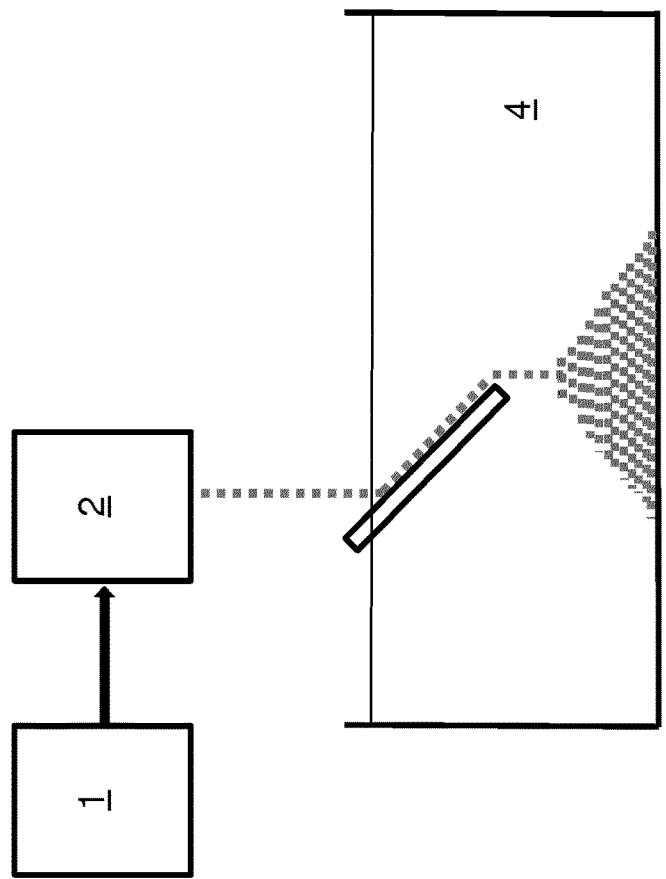
FIG. 6B is a side view of the apparatus of FIG. 6A.
Figure 6A:
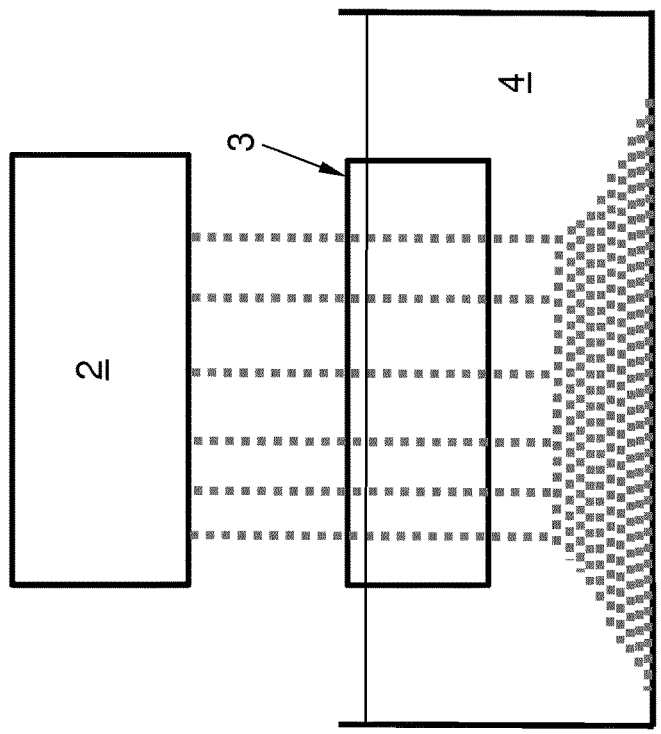
FIG. 6A is a front view of an illustrative apparatus configured for droplet deformation in accordance with aspects of the present teachings.

The deformation preferably comprises impacting the droplets on a deformation mechanism present at the surface of the gelling-reaction medium or in the gelling-reaction medium. FIGS. 6A (front view) and 6B (side view) schematically show an apparatus for carrying out a method according to the invention wherein the deformation is carried out by impacting. Herein slurry is pumped from a reservoir (1) through a nozzle (2), from which droplets of the slurry are allowed to fall.

The deformation mechanism preferably comprises a receiving surface for receiving the falling droplets (3). The receiving surface is arranged to deform the droplets. Advantageously, the receiving surface comprises perforations, indentations and/or protrusions to deform the droplets impacting on the receiving surface. The droplets can further proceed through the perforations to be gellified in the gelling-reaction medium (in FIG. 6 the medium is present in the bath 4). Or, the droplets may be removed from the receiving surface when few or no protrusions are present, e.g. by a swiping action, by vibration or by tilting of the receiving surface. Advantageously, the receiving surface has a tilted position, i.e. the receiving surface is positioned under an angle with respect to the falling direction, advantageously the angle is between approximately 10 and approximately 80 degrees, more advantageously between approximately 20 and approximately 60 degrees and more advantageously approximately 40 degrees. By providing a tilted position of the receiving surface, the droplets falling through perforations may continue in the gelling-reaction medium, other droplets may fall of the receiving surface by means of gravity and may then continue in the gelling-reaction medium. In a preferred embodiment, the receiving surface is a planar surface and may be an upper surface of a plate. In a preferred embodiment, the deformation mechanism is selected from gratings, meshes, grids and tilted plates. The meshes or grating may be positioned essentially horizontally or tilted. In an embodiment, the tilted plates are perforated. In a preferred embodiment, the tilted plates are provided with protuberances, such as a grit, or with indents.

The degree of deformation is inter alia affected by the velocity at which the droplets impact with the deformation mechanism. In a method wherein the droplets are allowed to fall to generate the impact velocity with the deformation mechanism, the impact velocity can easily be adjusted by adjusting the falling distance of the droplets before the impact with the mechanism, or by adjusting the speed (flow rate) at which the droplets are ejected from the nozzle or another ejection mechanism.

The gellification of the droplets takes place in a liquid gelling-reaction medium, usually an aqueous solution of the multivalent cations, preferably a solution of an inorganic salt of the multivalent cation in water. The concentration of the salt containing the multivalent cations is usually chosen in the range of 0.05-10 wt. %, preferably in the range of 0.1-2 wt. %. In principle any salt can be used that is soluble at the desired concentration under the given circumstances. In particular, suitable salts include inorganic salts, such as chloride salts and nitrate salts.

The gellification reaction is induced dependent on the type of gelling agent (chemically, thermally, photonically). As indicated above, gellification of an anionic polymer with the aid of a multivalent cation is preferred. In principle, any cation capable of forming a link with two anionic groups of the polymer can be used, in particular any of the above mentioned cations.

In particular, good results have been achieved with a reaction medium containing rare earth metal ions, in particular yttrium ions. Rare earth metal ions are suitable as a gelling agent for the preparation of grains that contain silicon oxide and for the preparation of grains that are free of silicon oxide.

In particular, calcium ions are advantageously used as an alternative to or in addition to rare earth metal ions in an embodiment wherein grains are made comprising silicon oxide.

The presence of calcium in grains comprising silicon oxide is thought to contribute to generating an amorphous phase in the grains or with respect to reducing a preferred sintering temperature to provide a ceramic grain with favourable properties. Reduction in sintering temperature is in particular advantageous for saving on energy consumption. It is further advantageous that calcium does not need to be removed from the gellified droplets, and thus a wash step of the gellified droplets can be omitted.

The residence time in the gelling-reaction medium is typically at least sufficient to provide gellified particles, i.e. particles that are dimension stable in the absence of an externally applied force. The residence time can be routinely determined based on common general knowledge and the information disclosed herein. As an indication, for a method wherein use is made of an anionic gelling agent and cations to cause gelation, the residence time usually is at least 5 min., in particular at least 20 min, more in particular at least 30 min. The gellified particles are usually removed from the reaction medium within a day, in particular within 6 hours, advantageously within an hour.

The gellified deformed droplets are dried, typically after isolation from the reaction medium; in particular in case gellification has been done using an anionic polymer as a gelling agent and a multivalent cation. If desired, the grains are washed with water, for instance to remove chloride which could react to form chlorine during sintering.

In an advantageous embodiment drying is done without washing the gellified deformed droplets. This is material—(water), time- and energy-saving.

Drying is preferably done in a method step, separate from the sintering step. Drying is typically done at a lower temperature than existing in a high temperature furnace used for sintering, in particular because this is more efficient. The drying is preferably carried out at a temperature below 100° C., in particular at a temperature between 40 and 80° C., e.g. in air. Drying is preferably carried out until the residual water content is less than 5 wt. %, in particular about 3 wt. % or less.

The sintering temperature usually is in the range of 1200-1600° C.

The sintered grains of the invention usually have a size in the range of about 0.5 to about 6 mm, in particular in the range of about 1 to about 5 mm, more in particular in the range of 1-3 mm. Preferably, 10 vol % or less of a plurality of the grains according to the invention have a size of 0.7 mm or less. This fraction of the grains is also referred to in the art as '$d_{10}$'. More preferably, $d_{10}$ is in the range of 0.9-1.8 mm, in particular in the range of 1.0-1.6. Preferably, 50 vol % or less of a plurality of grains according to the invention have a size of less than 1.3 mm. This fraction of the grains is also referred to in the art as '$d_{50}$'. More preferably, $d_{50}$ is in the range of 1.3-2.2 mm, in particular in the range of 1.4-2.0 mm. Preferably, 90 vol % or less of a plurality of grains according to the invention have a size of less than 5 mm. This fraction of the grains is also referred to in the art as '$d_{90}$'. More preferably, $d_{90}$ is in the range of 1.6-3 mm, in particular in the range of 1.8-2.5 mm.

In a specific embodiment, the grains have a $d_{10}$ of 1.3-1.5, a $d_{50}$ of 1.6-1.8 and a $d_{90}$ of 1.8-2.1. as determined by a Camsizer®.

As used herein, $d_{10}$, $d_{50}$ and $d_{90}$ are as determinable by a Camsizer®.

As mentioned above, the method allows the preparation of grains having a high homogeneity in size, without needing to screen the grains. Therefore the polydispersity of the grains is relatively low. A measure for homogeneity in accordance with the invention is the ratio $d_{10}$ to $d_{90}$. The grains are in particular considered homogenous in size if the ratio $d_{10}$ to $d_{90}$ is in the range of 0.60:1 to 1:1. In particular, the invention provides (a plurality of) grains wherein the ratio $d_{10}$ to $d_{90}$ is in the range of 0.65:1 to 0.85:1, more in particular in the range of 0.70:1 to 0.80:1.

In principle, a method of the invention allows the preparation of ceramic grains comprising any ceramic precursor material. In particular the invention has been found useful to provide a ceramic oxide comprising aluminium oxide, and zirconium oxide. The zirconium and aluminium, taken together and expressed as their oxides, form 70-99 wt. % of the ceramic composition, in particular 80 wt. % or more, more in particular 90 wt. % or more.

The aluminium content, expressed as $Al_2O_3$, is at least 3 wt. %, preferably is at least 5 wt. %, more preferably at least 7 wt. %, in particular at least 10 wt. %, more in particular at least 14 wt. %. In a specific embodiment, aluminium content, expressed as $Al_2O_3$, is 30 wt. % or more, in particular 35 wt. % or more.

The aluminium content, expressed as $Al_2O_3$, preferably is 50 wt. % or less, more preferably 45 wt. % or less, in particular 40 wt. % or less. Preferably more than 50% of the aluminium in the grains is present in the form of alpha-alumina. More preferably essentially all of the aluminium is present in the form of alpha-alumina.

The zirconium content, expressed as $ZrO_2$, of the grains preferably is 42 wt. % or more, more preferably 45 wt. % or more, in particular 50 wt. % or more, more in particular at least 52 wt. %, or at least 55 wt. %. In a specific embodiment the zirconium content, expressed as $ZrO_2$, of the grains is 70 wt. % or more, in particular 75 wt. % or more.

The zirconium content, expressed as $ZrO_2$, of the grains preferably is 90 wt. % or less, in particular 85 wt. % or less, more in particular 82 wt. % or less. Zirconia contributes to the toughness of the ceramic grains. However, the present invention allows the preparation of grains with a satisfactory toughness for use in metal-ceramic wear components at relatively low zirconia content.

The zirconia usually has a tqc ratio—i.e. the sum of the weights of [tetragonal $ZrO_2$+tetragonal-prime+cubic zirconia] divided by the sum of the weights of [tetragonal $ZrO_2$+monoclinic $ZrO_2$.+tetragonal-prime $ZrO_2$+cubic zirconia times 100%]—in the range of 10-100%, in particular 25-100%, more in particular 35-95%.

In addition to zirconia and alumina, the grains of the invention comprise one or more further components. These are typically inorganic. The total content of components other than zirconia and alumina typically is 30 wt. % or less, preferably 20 wt. % or less, more preferably 15 wt. % or less, in particular 10 wt. % or less, more in particular 5 wt. % or less. The total content of the one or more components other than zirconia and alumina is 1 wt. % or more, in particular 1.5 wt. % or more, more in particular at least 2 wt. % or at least 3 wt. %.

Particularly preferred is a component providing one or more rare earth elements. Usually, if present, the rare earth metal content, expressed as rare earth metal oxide, is 0.3 wt. % or more, preferably 0.5 wt. % or more, more preferably at least 1 wt. %. Usually, the rare earth metal content is 10 wt. % or less, preferably 6 wt. % or less, more preferably 5 wt. % or less, in particular 4 wt. % or less, more in particular 3.5 wt. %.

In particular, good results have been achieved with yttrium. If present, the yttrium content, expressed as $Y_2O_3$, usually is at least 0.1 wt. %, preferably at least 0.3 wt. %, more preferably at least 0.5 wt. %, in particular at least 0.8 wt. %, more in particular at least 1.5 wt. %. Usually, yttrium content, expressed as $Y_2O_3$, is 6 wt. % or less, preferably 5 wt. % or less, in particular 3.5 wt. %, or less.

Another rare earth element, which is optionally present, is cerium. If present, its content generally is less than 5 wt. %. Preferably, the cerium content is 0-2 wt. %, more preferably 0-1 wt. %, more preferably 0-0.5 wt. %. Good results have been achieved with ceramic grains that are essentially free of cerium.

In a further preferred embodiment, the grains comprise calcium. If present, the calcium content, expressed as CaO usually is at least 0.03 wt. %, in particular at least 0.1 wt. %, more in particular at least 0.5 wt. %. The calcium content usually is 5 wt. % or less, preferably 3 wt. % or less, in particular 2 wt. % or less.

In an embodiment, the sintered ceramic grains comprise alpha-alumina, zirconia, which are both crystalline phases, and an amorphous phase. If present, the amorphous phase content usually is at least 0.1 wt. % of the grain, preferably at least 1 wt. %, in particular at least 3 wt. %. The amorphous phase content usually is 80 wt. % or less, preferably 50 wt. % or less, in particular 30 wt. % or less, more in particular 20 wt. % or less.

In a specific embodiment, the grains comprise mullite. If present, its content usually is at least 1 wt. %. The mullite phase content usually is 25 wt. % or less, preferably 20 wt. % or less, in particular 17 wt. % or less.

The spinel content usually is 0-5 wt. %, in particular 0.1-4 wt. %.

In a preferred embodiment the grains comprise:
- 3-55 wt. %, more preferably 10-45 wt. %, in particular 14-40 wt. % alumina,
- 40-95 wt. %, more preferably 45-90 wt. %, in particular 55-95 wt. %-zirconia,
- 1-30 wt. %, more preferably 2-10 wt. % of other inorganic component(s), said other components comprising at least one component selected from the group of rare earth metal oxides and alkaline earth metal oxides. The rare earth metal oxide preferably is yttrium; the alkaline earth metal oxide preferably is calcium.

In particular, good results with respect to wear resistance have been achieved with a metal-ceramic metal composite wear component made from a ceramic structure according to the invention comprising aluminium, zirconium, yttrium and optionally calcium, in the following amounts (based on total weight of the ceramic):
- aluminium content, expressed as $Al_2O_3$, 14-50 wt. %, in particular 14-39 wt. %;
- zirconium content, expressed as $ZrO_2$, 45-90 wt. %; in particular 50-82 wt. %;
- yttrium content, expressed as $Y_2O_3$, 0.5-4 wt. %;
- calcium content, expressed as CaO, 0-2 wt. %, in particular 0.03-1.5 wt. %, more in particular 0.3-1.0 wt. %.
- balance, formed by other components: 0-5 wt. %, in particular 0.2-4 wt. %, more in particular 0.5-2 wt. %.

The crystallographic composition of the ceramic structure from which the wear component is made, preferably is as follows (at least before casting; all amounts based on total weight of the ceramic):
- 3-55 wt. %, in particular 7-45 wt. % alpha-alumina;
- 40-95 wt. %, in particular 45-90 wt. %, more in particular 50-82 wt. % zirconia (including elements other than zirconium which may form part of the zirconia crystal structure, such as Hf and Y).

In this specific embodiment, the sum of alpha-alumina and zirconia preferably forms 90-100 wt. %, in particular 95-100 wt. % of the grains.

Such a ceramic-metal wear component has in particular been found to have good wear resistance in a comminution device, such as a milling device.

The invention has in particular been found suitable to provide grains having (on average) a sphericity (anisotropy)—defined as shortest projected size to longest projected size—in the range of 0.65-0.9, in particular in the range of 0.70-0.80, more in particular in the range of 0.71-0.77, as determined by a Camsizer®.

Preferably, the sintered ceramic grains according to the invention have a density of 3-6 kg/l, hardness, as determined by Vickers indentation at 98N, of 900-1600.

The sintered grains are in particular useful to prepare an open-porous ceramic structure which can be used for the ceramic phase of a metal-ceramic composite. The ceramic structure is an open-porous ceramic structure formed of a three-dimensionally interconnected network of ceramic grains bound by a binding agent, wherein a packing of the grains provides for open pores between the grains, which pores fillable by a liquid metal. FIG. 5 shows an example of a ceramic structure according to the invention.

In an advantageous embodiment, the open-porous ceramic structure comprises supply-channels that are in connection with the pores, allowing filling of the pores by the liquid metal via the supply channels. By providing supply-channels in the ceramic structure, there are more entries to the ceramic structure, and thus to the pores, to supply the liquid metal to fill the pores. Also, when the supply channels are provided as recesses in the ceramic structure, the contact area with the grains, and thus the number of entrances to the pores, is larger, compared to a structure without supply channels, so the liquid metal can fill the pores more deeply and thus it allows deeper reinforcement into the core of the ceramic structure, and possibly beyond the core towards the surface of the ceramic structure facing the mold surface. Advantageously, the supply channels are through channels, allowing filling of the ceramic structure from both sides, thereby increasing a penetration depth of the liquid metal and/or reducing the time for filling the pores with the liquid metal.

An advantageous embodiment for providing the supply channels is to arrange the grains in a honeycomb like structure, around one or more cylindrical or conical open spaces, which serve as a supply channel to let liquid metal flow into the pores of the ceramic structure. The supply channels can have a round (circular, ellipsoid) or a polygonal cross-section. The supply channels are in fluid communication with the pores, allowing passage of liquid metal from the supply channels into the pores.

The ceramic structure can be manufactured in a manner known per se, e.g. as described in EP-A 930 948.

In an advantageous embodiment, the grains are arranged in the intended shape for the ceramic structure and bonded with a binding agent. The grains are usually coated with a dispersion of the binding agent in water or another liquid. After arranging the grains a drying step is usually carried out whereby the liquid evaporates and the binder forms solid bonds between the grains. The binding agent preferably is an inorganic binding agent. Suitable inorganic binding agents are usually selected from water glass, mineral clay, zeolites, sodium silicates and aluminium silicates. In particular, good results have been achieved with a sodium silicate, which is advantageously used in combination with alumina powder.

The grains of the invention, in particular the ceramic structure comprising the grains of the invention is in particular suitable for the preparation of a ceramic-metal composite, such as a metal-ceramic wear component The ceramic-metal composite can be manufactured in a method known per se, preferably by classical or centrifugal casting, e.g. as described in EPA 930 948.

In a preferred embodiment, the metal is iron, preferably an alloy thereof. In particular preferred are white chromium iron and martensitic steel. In another embodiment the metal is aluminium.

The invention further relates to the use of a metal-ceramic composite wear component according to the invention in the comminution (diminution) of materials, in particular of geological materials. Preferred materials to be subjected to a comminution process in accordance with the invention are materials selected from the group of limestone, coal, ore, oil-sand, cement, concrete, petcoke, biomass, slag and aggregate.

A comminution device according to the invention is preferably selected from the group of crushers, impactors and mills, in particular from the group of horizontal shaft crushers, vertical shaft impactors and vertical mills. In a specific embodiment the wear component is a hammer for a horizontal crusher.

The comminution of a material in accordance with the invention can be done in a manner known per se.

In a specific embodiment, the wear component is a wear component of an abrasive cut-off tool, made from ceramic grains or an open-porous ceramic structure according to the invention.

In a specific embodiment, the ceramic metal composite made from the grains or ceramic structure of the invention is a composite armour.

In a specific embodiment, the ceramic metal composite made from the grains or ceramic structure of the invention is a wear component of a dredging pump.

In a specific embodiment, the grains of the invention are used to provide a flexible coated abrasive product (sandpaper).

The invention will now be illustrated by the following examples.

COMPARATIVE EXAMPLE

A batch of ceramic grains produced by melting, quenching and then crushing were commercially obtained from Saint-Gobain (CE) comprising: 59 wt. % alumina, 40 wt. % zirconia (including $HfO_2$), and 0.80 wt. % yttrium oxide Examples 1-3

Grains of a different composition were prepared as follows (conditions are ambient, typically about 20-30° C. unless specified otherwise) Raw material mixtures of metal oxide particles and silicate particles were prepared having the following composition.

| Raw materials | Ex1 | Ex2 | Ex3 |
|---|---|---|---|
| $Al_2O_3$ | 38.5 | 39.8 | 14.9 |
| $ZrSiO_4$ | 11.7 | | |
| $Zr(Hf)O_2$ | 46.2 | 58.3 | 82.1 |
| $Y_2O_3$ | 3.1 | 1.9 | 3.0 |
| $CaCO_3$ | 0.5 | | |

A slurry of the raw material mixtures in water was prepared. The water contained about 1 wt. % dispersing agent Dolapix CE64™. The content of raw materials was about 72 wt. %. The particles in the slurry were ground in an attritor, until a slurry was obtained wherein the $d_{50}$ of the particles was about 0.25 μm.

A 5 wt. % (Ex1) or 0.5 wt. % (Ex2 and Ex3) aqueous solution of gelling agent (sodium alginate) was added to the slurry to obtain a slurry containing about 0.7 wt. % (Ex1) or 1.1 wt. % (Ex2 and Ex3) alginate and about 65 wt. % (Ex1) or 35 wt. % (Ex2 and Ex3), raw materials based on the total dry weight of the slurry.

The resultant slurry was pumped through a nozzle (3 mm aperture) positioned at a height of 10 cm above the gelling-reaction medium (an aqueous solution of 0.3 wt. % calcium chloride dihydrate (Ex1) or 2 wt % yttrium nitrate hexahydrate (Ex2 and Ex3).

The gelling medium was present in a reaction bath that was provided with tilted plates having a grid on the upper surface upon which the slurry droplets impacted. The plates were partially submerged in the liquid medium, such that falling droplets impacted on the plates and were allowed to slide into the liquid medium.

The gelled particles were removed from the reaction medium after about 1 hour and dried in hot air (up to 80° C.) until the residual water content was about 1%.

The dried particles were sintered.

The grain compositions after sintering are indicated in the table below.

| Chemical composition of the grains | Ex1 | Ex2 | Ex3 |
|---|---|---|---|
| $Al_2O_3$ | 38.5 | 39.5 | 14.8 |
| $ZrO_2$ (+$HfO_2$) | 54 | 58 | 81.7 |
| $Y_2O_3$ | 3.1 | 2.5 | 3.5 |
| $SiO_2$ | 3.8 | | |
| CaO | 0.6 | | |

Sintering temperature and dwell time are indicated in the Table below.

The sizes distribution ($d_{10}$, $d_{50}$, $d_{90}$) and the sphericity of samples of the produced grains (Ex1-Ex3) and the comparative grains (CE) were determined with a Camsizer®.

The sizes distributions ($d_{10}$, $d_{50}$, $d_{90}$) and the sphericity of samples of the produced grains (Ex1-Ex3) and the comparative grains (CE) were determined with a Camsizer®.

Hardness of the grains was determined as follows by Vickers indentation with a load of 98 N (to be checked with ASTM C 1327).

Crystallographic composition can be determined by X-ray diffraction (XRD), by the reconstruction of the diffraction spectrum based on the theoretical individual diffraction spectrum and atomic structure of the different crystallographic phases (Rietveld method).

| | Ex1 | Ex2 | Ex3 | CE |
|---|---|---|---|---|
| Manufacturing process | Sintering (direct size and shape) | Sintering (direct size and shape) | Sintering (direct size and shape) | Melting, quenching then crushing |
| Sintering or Melting temperature (° C.) | 1450 | 1600 | 1540 | 2000 |
| Dwell time (hrs) | 2.5 | 2.5 | 2.5 | |
| Density | 4.74 | 4.99 | 5.62 | 4.6 |
| D10 (mm) | 1.436 | 1.428 | 1.444 | 1.072 |
| D50 (mm) | 1.714 | 1.686 | 1.695 | 1.461 |
| D90 (mm) | 2.031 | 2.004 | 1.964 | 1.875 |
| Sphericity | 0.743 | 0.734 | 0.766 | 0.671 |
| Hardness | 14 GPa | 15 GPa | 14 GPa | 16-18 GPa |
| α-$Al_2O_3$ | 34.7 | 39.5 | 14.8 | 61 |
| $ZrO_2$ tetragonal | 36.9 | 49.5 | 69.2 | 33 |
| $ZrO_2$ tetragonal prime | 7.3 | 9.5 | 14.5 | 1 |
| $ZrO_2$ monoclinic | 3.1 | 1.5 | 1.5 | 4 |
| ZrC | | | | 1 |
| Mullite ($3Al_2O_3 \cdot 2SiO_2$) | 3 | | | |
| Spinel ($MgAl_2O_4$) | | | | |
| Amorphous phase[1] | 15 | | | |
| Tqc | 93 | 97.5 | 98.2 | 89 |

[1]The amorphous phase has been measured using Rietveld method by adding a known amount of a reference crystalline material (quartz) to the sample.

Binocular view photographs of whole grains (FIGS. 1.1-1.3), microscope views of polished cross-sections (FIGS. 2.1-2.3) and electronic microscope views (FIGS. 3.1-3.3, scale bar is 10 μm; FIGS. 4.1-4.3; scale bare is 10 μm) were made of the grains.

Comparative images were made of grains of Comparative Example 1 (FIGS. 1.4, 2.4, 3.4 and 4.4 respectively).

The electronic microscope views were made after etching the grains by the following procedure: Mirror polishing of the grains embedded in a resin matrix. Removing some grains from the resin, then thermal etching (under air, 20 min at a temperature 50 to 100° C. below the sintering temperature in an electric furnace.

The whitish parts are zirconia.

The darker parts alumina/mullite/spinel/anorthite/amorphous phase.

Example 4

Two 3D-open porous ceramic structures for preparing an anvil of a Vertical Shaft Impactor (VSI) crusher were made of the grains prepared using the methodology as described in Examples 1-3.

The grains had the following composition:

| Aluminum Oxide | 38.4% |
|---|---|
| Zirconium Oxide | 54.0% |
| Silicon oxide | 3.8% |
| Yttrium oxide | 3.10% |
| Calcium oxide | 0.60% |

The ceramic structures were made as follows: the grains were mixed with 4 wt. % of mineral glue comprising sodium silicate, alumina powder and water. The grains with the glue were poured inside a mould of the desired design. The mould and contents were heated to 100° C. until all water had evaporated. Then the ceramic structure was removed from the mould.

Reference Example 1

Grains were provided using the methodology of EP 930 948. They had the following composition:

| Aluminum Oxide | 60.0% |
|---|---|
| Zirconium Oxide | 39.0% |
| Titanium Oxide | 0.15% |
| Silica | 0.35% |
| Iron Oxide | 0.15% |
| Sodium Oxide | 0.03% |
| Calcium Oxide | 0.09% |
| Magnesium Oxide | 0.02% |
| Yttria | 0.80% |

Two ceramic structures of the same design as the structure of Example 4 were made using the grains of the Reference Example, using the same method.

Example 5

From the ceramic structures of Example 4 and the ceramic structures of the Reference Example 1, ceramic metal wear components (anvils for vertical shaft impactors) were made as follows: the ceramic structures were individually placed into a sand mould, the liquid metal (an iron alloy) was poured onto the structure and allowed to cool down.

Further two anvils where made of metal of the same metallurgic composition but without ceramics (full metal anvils).

All six anvils were weighted and thereafter mounted on the same ring of a VSI crusher, to ensure that all anvils were tested under the same conditions. The crusher was used to crush river gravel. After 60 hrs of operation the anvils were removed and weighted again.

In this application, no improvement was visible with respect to wear resistance for the anvils made with the grains from the Reference Example 1, compared to the full metal anvils. However, it was visually noticeable that the anvils made with grains according to the invention (Example 4) were less worn. Moreover, a comparison of the weight losses indicated that the wear of the anvils according to the invention was 50% lower than for the anvils of the reference examples or the full metal anvils.

Example 6

One roller of a vertical roller mill was made with grains made with a method according to the invention, using the methodology as described in Examples 1-3. The grains had the following composition:

| | |
|---|---|
| Aluminum Oxide | 14.8% |
| Zirconium Oxide | 81.7% |
| Yttrium oxide | 3.50% |

The ceramic structure for the roller was made using the same methodology as in Example 4. The ceramic-metal roller was made using the same methodology as in Example 5.

Further, a ceramic reference roller (Reference Example 2) was made in the same manner, except that the grains described in Reference Example 1 were used to make the ceramic structure.

Further, a roller of a vertical roller mill was made with the same metallurgical composition but without any ceramic grains to be used as a reference (full metal roller).

The three rollers were weighted before and after the wear test.

The three rollers were mounted in the same mill in a cement factory. They were thus subjected to the same operating conditions. After 3000 h of operation, the rollers were removed and weighted.

It was observed that the ceramic reference was less worn than the full metal roller. Its weight loss was 22% less compared to the full metal roller. The roller according to the invention was visually less worn than both the other rollers. Moreover, the weight losses indicated that the wear is 80% lower. Thus the wear resistance of the roller made with the grains of the present invention was considerably better than the wear resistance of the roller of Reference Example 2.

The invention claimed is:

1. A metal-ceramic composite wear component comprising:
   a ceramic structure formed of a three-dimensionally interconnected network of sintered ceramic grains in a metal matrix surrounding at least a part of the ceramic structure;
   said ceramic structure comprising sintered ceramic grains comprising 3-55 wt. % alumina, 40-95 wt. % zirconia, and one or more other inorganic components in a combined amount of 1-30 wt. %;
   said one or more other inorganic components comprising at least one component selected from the group consisting of rare earth metal oxides, alkaline earth metal oxides, silicates, carbides, nitrides, and borides;
   wherein the rare earth metal oxide represents 1-10 wt. % when present; and
   wherein the sintered ceramic grains are rounded and free of sharp edges.

2. The metal-ceramic composite according to claim 1, wherein the one or more other inorganic components includes a rare earth metal oxide comprising yttrium oxide.

3. The metal-ceramic composite according to claim 2, wherein an yttrium content of the sintered ceramic grains, expressed as yttrium oxide, is 6 wt. % or less.

4. The metal-ceramic composite according to claim 2, wherein an yttrium content of the sintered ceramic grains, expressed as yttrium oxide, is at least 1.5 wt. %, and wherein the one or more other inorganic components further includes 0-2 wt. % cerium, expressed as cerium oxide.

5. The metal-ceramic composite according to claim 1, wherein the sintered ceramic grains are spheroidal when observed at the macroscopic level.

6. The metal-ceramic composite according to claim 1, wherein the sintered ceramic grains have a striated or grooved surface.

7. The metal-ceramic composite according to claim 1, wherein the one or more other inorganic components includes a rare earth metal oxide, and a rare earth metal content of the sintered ceramic grains, expressed as rare earth metal oxide, is 1-5 wt. %.

8. The metal-ceramic composite according to claim 1, wherein the zirconia of the sintered ceramic grains has a tqc ratio in the range of 25-100%, wherein the tqc ratio is defined as: 100% multiplied by the sum of the weights of [tetragonal zirconia, tetragonal-prime zirconia, and cubic zirconia] divided by the sum of the weights of [tetragonal zirconia, monoclinic zirconia, tetragonal-prime zirconia, and cubic zirconia].

9. The metal-ceramic composite according to claim 1, wherein the sintered ceramic grains comprise a calcium content, expressed as calcium oxide, of 0.01-5 wt. %.

10. The metal-ceramic composite according to claim 1, wherein said one or more other inorganic components of the sintered ceramic grains further includes zirconium silicate.

11. The metal-ceramic composite according to claim 1, wherein the sintered ceramic grains are produced by a method comprising:
    making a slurry comprising alumina, zirconia and a gelling agent;
    making droplets of the slurry;
    introducing the droplets in a liquid gelling-reaction medium wherein the droplets are gellified, which liquid gelling-reaction medium preferably comprises at least one component selected from the group of rare earth metal ions and alkaline earth metal ions, which droplets are preferably introduced in the gelling-reaction medium by letting them fall
    deforming the droplets before, during or after gellification, preferably by impacting the droplets on a deformation mechanism arranged for deforming the droplets upon receiving of the droplets, which deformation mechanism preferably is present at the surface of the gelling-reaction medium or in the gelling-reaction medium;
    drying the gellified deformed droplets, thereby obtaining dried grains and sintering the dried grains, thereby obtaining the ceramic grains.

12. A comminution device selected from the group consisting of grinding devices and crushing devices comprising the metal-ceramic composite wear component according to claim 1.

13. An abrasive cut-off tool made from the metal-ceramic composite according to claim 1.

14. A composite armour made from the metal-ceramic composite according to claim 1.

15. A dredging pump and tool made from the metal-ceramic composite according to claim 1.

16. A flexible coated abrasive product having an abrasive surface provided with the metal-ceramic composite according to claim 1.

* * * * *